United States Patent [19]

Beauchamp

[11] 4,124,052
[45] Nov. 7, 1978

[54] HIGHWAY CROSS-COUNTRY TIRE

[76] Inventor: Aaron C. Beauchamp, 1168 26th St., Moline, Ill. 61265

[21] Appl. No.: 727,075

[22] Filed: Sep. 27, 1976

[51] Int. Cl.² .................................................. B60C 11/06
[52] U.S. Cl. ........................... 152/209 B; 152/352 R; 152/353 R
[58] Field of Search .................. 152/5, 209 R, 209 B, 152/209 WT, 208, 352, 353 R

[56] References Cited

U.S. PATENT DOCUMENTS

| | | | |
|---|---|---|---|
| 1,439,485 | 12/1922 | Schlueter | 152/209 R |
| 1,664,352 | 3/1928 | Coleman | 152/209 R |
| 2,203,617 | 6/1940 | Hale | 152/209 B |
| 2,235,375 | 3/1941 | Kraft | 152/208 |
| 2,650,632 | 9/1953 | Langdon | 152/209 R |
| 3,012,598 | 12/1961 | Busch | 152/208 |

FOREIGN PATENT DOCUMENTS

| | | | |
|---|---|---|---|
| 755,137 | 8/1956 | United Kingdom | 152/209 R |
| 785,097 | 10/1957 | United Kingdom | 152/209 R |

*Primary Examiner*—Randolph A. Reese
*Attorney, Agent, or Firm*—Peter A. Taucher; John E. McRae; Nathan Edelberg

[57] ABSTRACT

A tire having a centrally-located traction area for engagement with the highway or other firm terrain, and spaced lugs in the outboard shoulder areas alongside the traction area; the lugs exert paddle wheel action in mud, snow, sand or other soft terrain. Lug profiles are such that the lugs are spaced away from the ground surface during operations on firm terrain.

1 Claim, 3 Drawing Figures

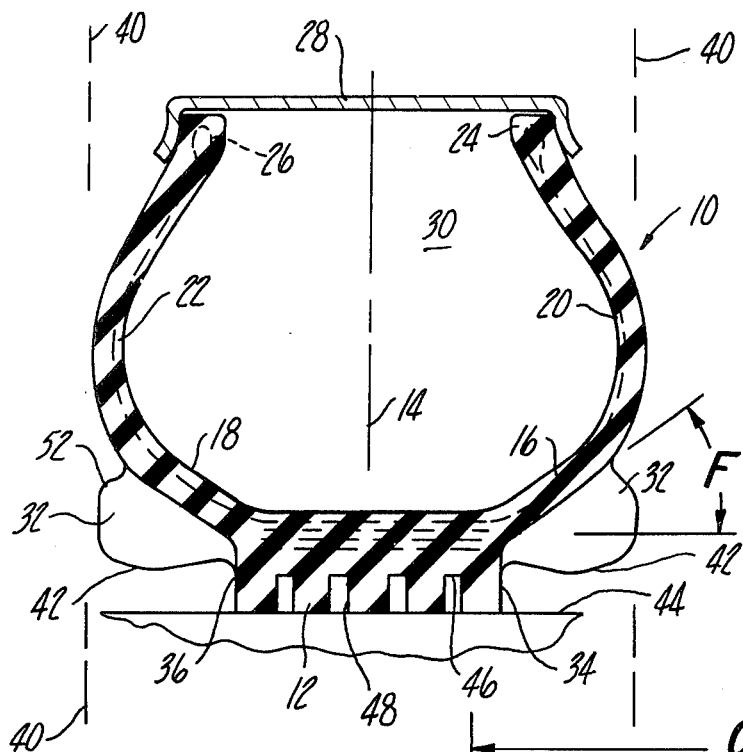
Fig-1
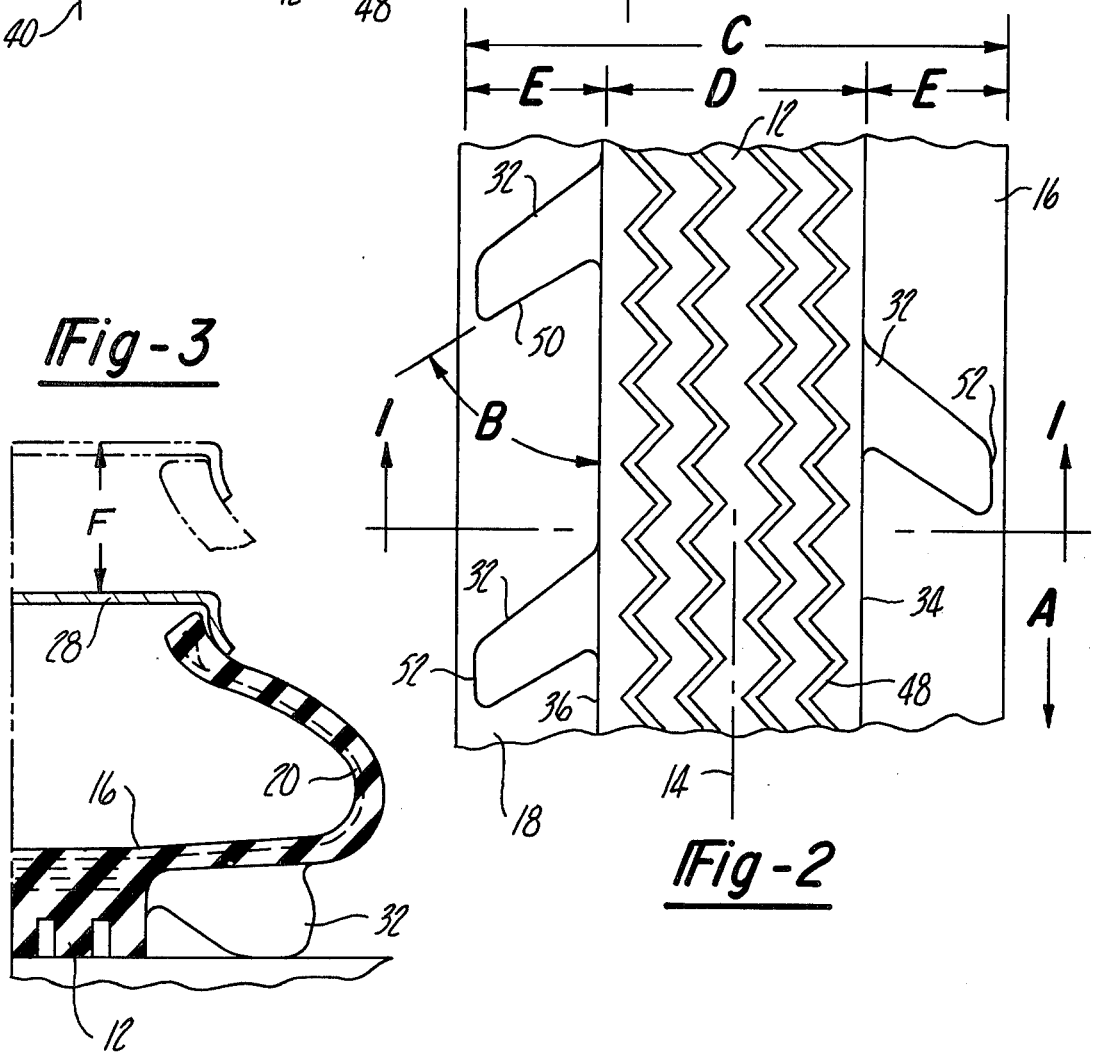
Fig-3
Fig-2

HIGHWAY CROSS-COUNTRY TIRE

The invention described herein may be manufactured, used, and licensed by or for the Government for governmental purposes without payment to me of any royalty thereon.

BACKGROUND AND SUMMARY OF THE INVENTION

This invention relates to a tire that can be used on military vehicles or other vehicles required to operate in a wide variety of different environments, such as concrete highways, mud, snow, sand, gravel, etc. An aim of the invention is to provide a tire that provides a combination of multiple advantages, including a fairly soft ride on smooth terrain, good cushionability i.e. low spring rate, large soft soil penetration and displacement, good lateral stability and skid resistance on firm terrain, and good wearability.

THE DRAWINGS

FIG. 1 is a cross sectional view taken through a tire carcass constructed under the invention.

FIG. 2 is a fragmentary edge view of the FIG. 1 tire carcass, showing a tire segment approximately one footprint in length.

FIG. 3 is a half section taken in the direction of FIG. 1, but with the tire in a flexed condition.

The tire shown in FIGS. 1 and 2 comprises an inflatable elastomeric toroidal tire carcass 10 having a tread area 12 centered about the imaginary radial midplane 14. Angling away from tread area 12 are two shoulder walls 16 and 18 that merge with vertical sidewalls 20 and 22. The inner ends of the side walls terminate in beads 24 and 26 that serve to mount the tire carcass on the wheel rim 28; a conventional check valve (not shown) enables interior space 30 within the carcass to be pressurized with air or inert gas in a conventional fashion.

Extending outwardly from shoulder walls 16 and 18 are two rows of lugs 32. Each lug extends along the shoulder wall surface from the respective side edge 34 or 36 of tread area 12 to the imaginary tire side plane 40. The radially outermost edge 42 of each lug terminates inwardly (or above) the traction surface plane 44 defined by tread area 12. Therefore, when the tire is rolling on hard or smooth terrain (FIG. 1) lugs 32 are spaced from the highway surface, i.e. the lugs are essentially inoperative or inactive. When the tire is immersed in soft terrain, such as mud or snow, the lugs 32 exert paddle wheel force on the terrain. Reaction of the terrain on the lugs provides vehicle propulsion effect.

Surfaces 42 of lugs 32 are approximately on the same plane as the bottom surfaces 46 of the traction grooves 48 formed in tread area 12. Therefore normal service wear of the tread area will not produce premature engagement of lugs 32 on firm ground surfaces. Grooves 48 may be conventional grooves commonly used for lateral stability, skid resistance and traction on dry and wet pavements. The grooves would in practice be relatively narrow grooves having both circumferential and axial directions, as provided by the zig-zag configuration of FIG. 2; contact-void ratio of the tread area would be relatively large, in the neighborhood of four to one.

As best seen in FIG. 2, each lug 32 extends at an acute angle to the tire mid plane 14. The exact angle is not considered critical; however some angularity is considered beneficial for achieving a media compacting action during soft soil operations. When the tire is rotating in the direction of arrow A (FIG. 2) the paddle surface 50 of the lug drives the media both circumferentially (arrow A direction) and axially toward surface 34 or 36, thereby tending to concentrate or compact the media inwardly from the lug outer edge 52. It is believed that such an action will advantageously improve the media reaction force and resultant vehicle propulsion process. The angularity of lugs 32 denoted in the drawings by numeral B is about 60 degrees. Some variation in this angle is believed possible while still achieving an advantageous mode of operation.

It will be seen from FIG. 2 that the lugs in each rows of lugs are relatively widely spaced. For example, if each lugs has a 1 inch circumferential dimension the corresponding void area might have a five inch circumferential dimension. The contact-void ratio would be about one fifth, i.e. 20 percent. Large void areas are believed to promote media compaction effects and media cleaning action when the tire is operating in sticky or cohesive clay-like media. The lug spacing is large, but not so large as to permit loss of the paddle wheel effect. FIG. 2 illustrates approximately a one footprint tire segment length. It will be seen that the lug spacing is such that at least one lug is at all time immersed in the terrain. To further ensure continuous immersion and media compaction the lugs associated with shoulder wall 16 are staggered relative to the lugs associated with shoulder wall 18.

It will be seen that the maximum axial dimension of the tire, denoted by letter C is appreciably greater than the axial width of tread area 12 denoted by letter D. The added width is necessary to accommodate lugs 32 while providing tire flexibility. In at least some tire sizes the tread area width (dimension D) is about twice the width of each lug area (dimension E). FIG. 3 illustrates the presumed flexing stroke F that takes place during severe jounce action on firm bumpy terrain. The lugs 32 tend to rigidify the associated shoulder wall 16 or 18; however, the angularity of each shoulder (FIG. 1) is such that each shoulder wall can flex through an angle F during severe jounce action. In the illustrate tire configuration the maximum flex angle is about thirty degrees. Such flexing advantageously relieves some of the flexing stress that would otherwise be applied to the side wall 20 or 22, thereby tending to prolong tire life. The tire design is such that retreading of worn tread area 12 is probably possible without rebuild of lugs 32; the tire carcass can be reused.

The drawing shows one embodiment of the invention. It will be appreciated however that minor variations and modifications may be necessary or desirable, as dictated by experimental development of the invention and adaptation to different tire sizes and vehicle wheel arrangements.

I wish it to be understood that I do not desire to be limited to the exact details of construction shown and described for obvious modifications will occur to a person skilled in the art.

I claim:

1. A combination highway cross-country tire comprising an inflatable elastomeric toroidal tire carcass having two sidewalls (20 and 22), a tread area (12), and shoulder walls (16 and 18) joining the tread area to the sidewalls; traction grooves in the tread area; and circumferentially spaced lugs (32) extending outwardly from each shoulder wall into the zones alongside the tread area; each shoulder wall being connected to the tread area radially inwardly from the plane of the traction surface defined by the tread area, whereby the lugs are spaced from the ground surface when the tire is rolling on the highway; said lugs projecting sufficient distances from the shoulder walls as to be immersed in the terrain when the tire is moving through soft terrain such as mud or snow, whereby said lugs act as terrain-displacement paddles; each shoulder wall, under normal operating pressure, extending from the tread area at an acute angle (F) that is approximately thirty degrees; each shoulder wall extending from the tread area for a substantial distance such that, under normal operating pressure, the axial thickness (C) of the tire is at least twice the tread width (D); the circumferential spacing of the lugs being appreciably greater than the lug circumferential thickness, whereby the "lug contact-lug void" ratio is appreciably less than one; the lugs being relatively thick in the circumferential and radial directions so that the lugs tend to stiffen the shoulder walls; the lugs extending along the shoulder wall surfaces to join the side edges (34 and 36) of the tread area, thereby reinforcing the tread-shoulder joint; the lug outer surfaces (42) being spaced radially inwardly from the traction surface plane (44), whereby severe jounce action on firm terrain hingedly flexes the shoulder walls to thereby cause the lugs to bottom on the terrain surface.

* * * * *